Patented Jan. 21, 1936

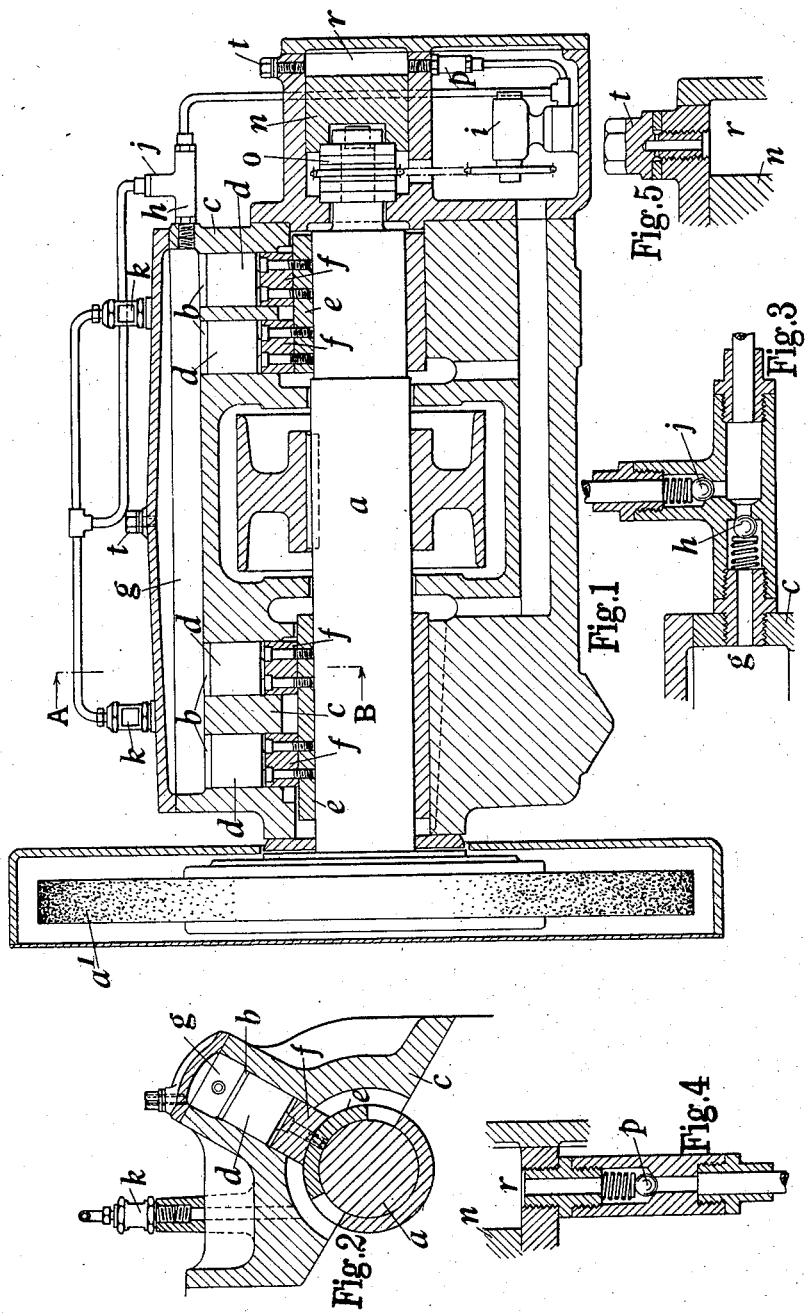

2,028,487

UNITED STATES PATENT OFFICE 2,028,487

SPINDLE BEARING

Harry Hales Asbridge, Ashton-on-Mersey, England, assignor to The Churchill Machine Tool Company Limited, Broadheath near Manchester, England, a British company Application March 1, 1934, Serial No. 713,595
In Great Britain April 13, 1933

7 Claims. (Cl. 308—9)

This invention relates to spindle bearings of the adjustable type, such as are used in machine tools where the maintenance of a close running fit is essential.

Heretofore the loading of the bearing has been adjusted manually or automatically. Automatic mechanical arrangements have in general the disadvantage that the load is the same whether the lubricant is thick or viscous as it may be at starting and when cold or whether it is relatively thin as it is when it attains the usual running temperature. It has been proposed to load the bearing hydraulically by means of a piston to which hydraulic pressure is applied to serve as a hydraulic cushioning device. Such arrangements have the defect that the hydraulic pressure has to be sufficiently high to prevent lifting of the bearing against the hydraulic pressure but a high bearing pressure is a defect as it causes excessive friction.

The object of the present invention is to provide means whereby the correct loading and running adjustment of the bearing is maintained automatically at all times irrespective of temperature variations or other conditions which might ordinarily affect the running conditions, whilst the bearing is prevented from being lifted by the shaft therein without the necessity of using more than a light loading pressure.

My invention comprises the arrangement in a hydraulically loaded journal or thrust bearing of means locking the hydraulic loading fluid against flow under the lifting pressure of the bearing whereby the said fluid is caused independent of its pressure to constitute a rigid non-yielding abutment to oppose any tendency of the bearing to lift.

My invention further comprises the provision of one or more pistons for loading the spindle bearing, with means supplying hydraulic fluid under pressure to the cylinder or cylinders containing such pistons through a non-return valve so that any tendency of the piston to expel fluid from the cylinder, due to the spindle rising or moving from its bearing, will be opposed by the fluid trapped in the cylinder or cylinders.

My invention further comprises the arrangement wherein the lubricant pump by which lubricant is delivered to the bearings, supplies the oil under pressure to the cylinder or cylinders from the pump side of a relief valve and the oil for lubricating purposes from the delivery side of such valve past, if desired, a sight feed device or devices to indicate that the system is functioning.

My invention further comprises the adaptation of my invention to take up end thrust on a spindle.

Referring to the accompanying sheet of explanatory drawing:—

Figure 1 is a longitudinal section of a rotary shaft having its bearings loaded in one convenient form in accordance with this invention.

Figure 2 is a cross section on the line AB of Figure 1 illustrating the upper part of a bearing.

Figures 3, 4 and 5 are detail sectional views of the valves and air vent plug shown in Figure 1.

In the illustrated application of my invention to a horizontal shaft $a$ carrying a grinding wheel $a^1$, I form cylinders $b$ in the upper portion of the bearing housing $c$ and provide a piston $d$ in each cylinder, each piston being adapted to load the adjustable member $e$ of the bearing through a pad or block $f$ which fits in the cylinder and is secured to $e$ so that it forms a guide for the latter to retain it in correct relationship to the shaft $a$. Oil pressure is supplied to the common header $g$ of the several cylinders $b$ past a non-return valve $h$ (see Figure 3). The oil is supplied by a pump $i$ which may be of the gear type and which has a relief valve $j$ (see Figure 3), which may be adjustable in the delivery system to ensure that the oil pressure does not exceed a predetermined maximum. The oil which passes the relief valve $j$ is utilized for lubricating the bearings and is delivered through sight feed devices $k$ to indicate that the system is in operation.

With my improvement, the pressure upon the bearings of the shaft $a$ is substantially constant under normal running conditions and is uninfluenced by temperature or other conditions. Such pressure can be made a minimum consistent with efficient running conditions, as should the shaft tend to rise from its lower bearing and so tend to move the pistons in the cylinders, the non-return valve $h$ traps the oil in the cylinders and there is therefore the resistance of the incompressible fluid preventing such rising movement independent of the actual pressure of the fluid. When the pump ceases to work and the shaft is stopped, the pressure gradually leaks off, so that at starting there is practically no fluid load upon the bearing until the lubricant arrives at the bearing. This is a very desirable feature. It wil be understood that during normal operation, the pump delivery is sufficient to maintain the pressure upon the bearings notwithstanding the small leakage inseparable from a construction involving pistons and like moving parts. In like manner, the gradual rate of leakage is insufficient to affect materially the hydraulic lock which resists sudden movement of the spindle against the loading pressure.

The actual loading of the adjustable member of the bearing may be effected by a direct connection between each piston and such adjustable member; or the bearing member may have a part thereon constituting the piston.

I do not limit myself to any details of the means for applying the pressure from the hydraulic piston to the spindle, neither do I limit myself to any particular number or disposition of the pistons relatively to the adjustable bearing members. In some cases, I may employ one piston for each bearing member.

My improvement may be applied to thrust bearings for resisting endwise movement of a spindle. In Figure 1, the piston $n$ loads the thrust bearing $o$ located at the end of the shaft $a$ to the desired extent. The non-return valve $p$ (see Figure 4) ensures the hydraulic lock for resisting any end movement which overcomes the fluid pressure.

My improvement may be applied to horizontal and to vertical spindles.

By slackening the bleed screws $t$ the detailed construction of which is shown in the sectional view, Figure 5, and air entrapped in the cylinder or header $g$ or in the space $r$ can be allowed to escape.

What I claim is:

1. A spindle thrust or journal bearing comprising two portions, one portion being fixed and one movable towards and away from said fixed portion, together with means to apply a hydraulic load to said movable portion comprising a member movable with said movable portion adapted by its movements to vary the volume of a substantially fluid tight chamber, an orifice in said chamber adapted for admission of hydraulic fluid thereto, and a non-return valve in said orifice.

2. A spindle thrust or journal bearing comprising two portions, one portion being fixed and one movable towards and away from said fixed portion, together with means to apply a hydraulic load to said movable portion comprising a member movable with said movable portion adapted by its movements to vary the volume of a substantially fluid tight chamber, an orifice in said chamber adapted for admission of hydraulic fluid thereto, and a non-return valve in said orifice, a pump arranged to deliver hydraulic fluid through said non-return valve together with a relief valve arranged between said pump and said non-return valve.

3. A spindle thrust or journal bearing as claimed in claim 2 wherein the relief valve specified is adapted to deliver fluid to a lubricating duct leading to said bearing.

4. A spindle thrust or journal bearing as claimed in claim 1 wherein the movable member specified is a piston adapted to reciprocate within a cylinder which constitutes the substantially fluid tight chamber specified.

5. A spindle thrust or journal bearing as claimed in claim 1 wherein the movable member specified is a piston adapted to reciprocate within a cylinder which constitutes the substantially fluid tight chamber specified, said piston being connected directly to said movable portion of said bearing.

6. A spindle thrust or journal bearing as claimed in claim 1 wherein the movable member specfiied is a piston adapted to reciprocate within a cylinder which constitutes the substantially fluid tight chamber specified, said piston being connected to a block partly entering within said cylinder and said block being directly connected to said movable portion of said bearing.

7. A spindle thrust or journal bearing according to claim 1 wherein the substantially fluid tight chamber specified comprises a header and a plurality of cylinders opening directly from said header.

HARRY HALES ASBRIDGE.